April 18, 1950  J. T. HARLAN, JR  2,504,682
PRODUCTION OF OXYGENATED COMPOUNDS
Filed Nov. 8, 1946  3 Sheets-Sheet 3
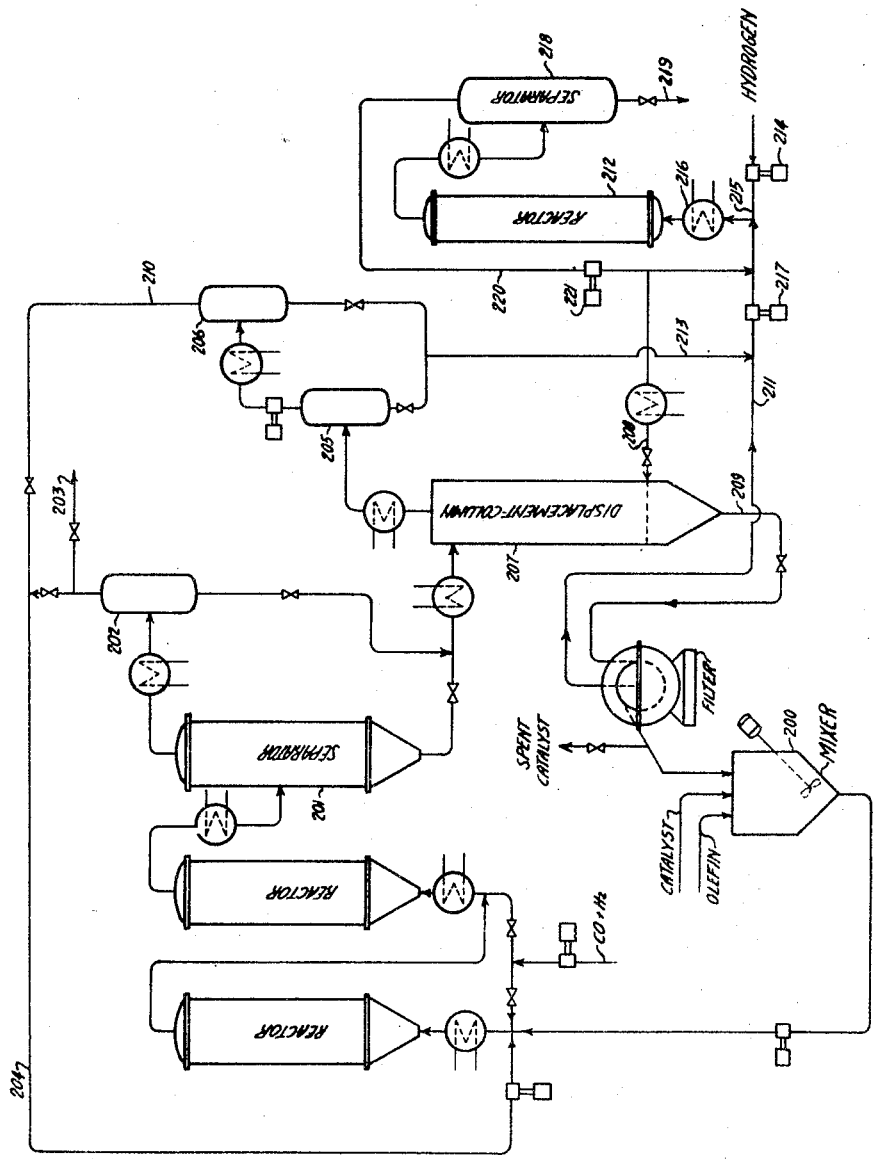
FIG. III
Inventor: James T Harlan Jr.
By his Attorney:

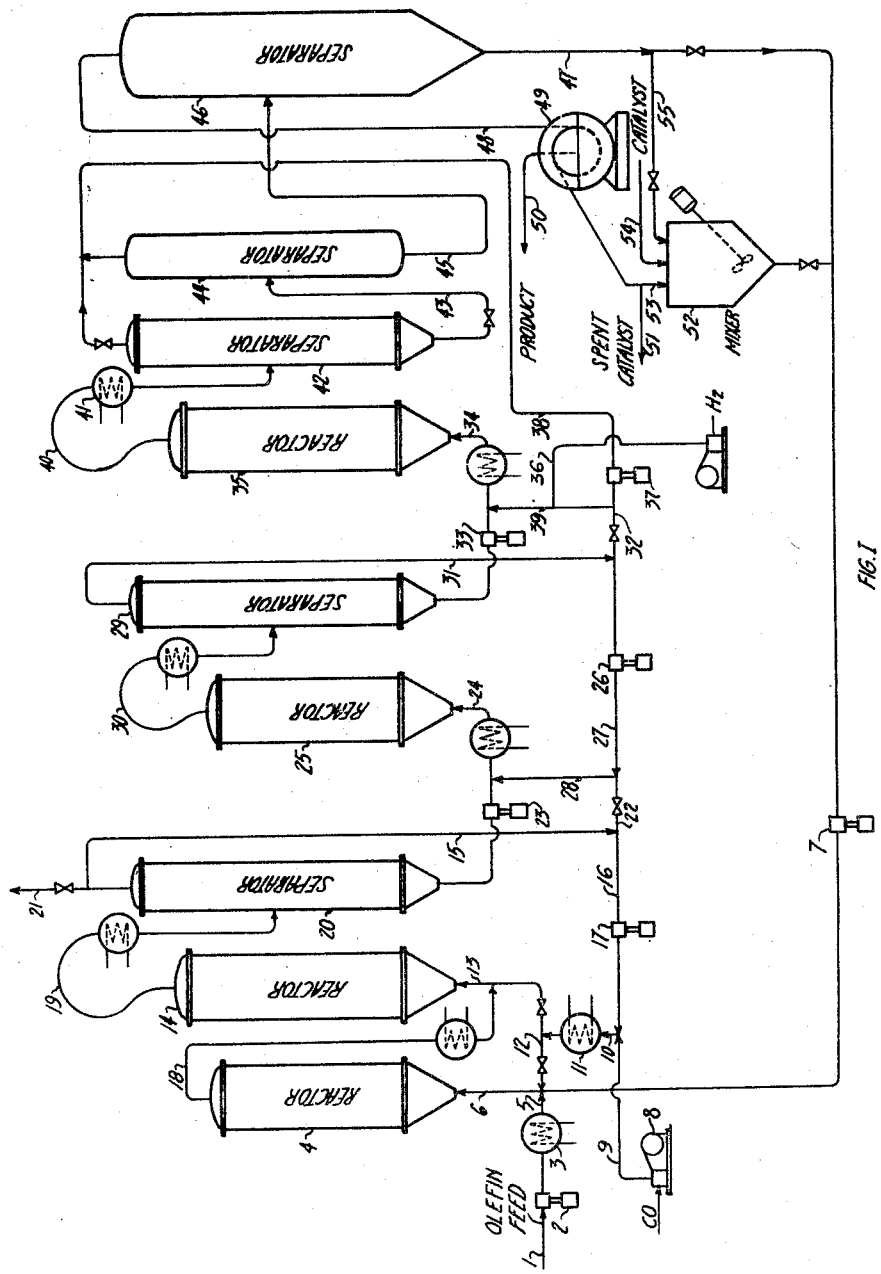

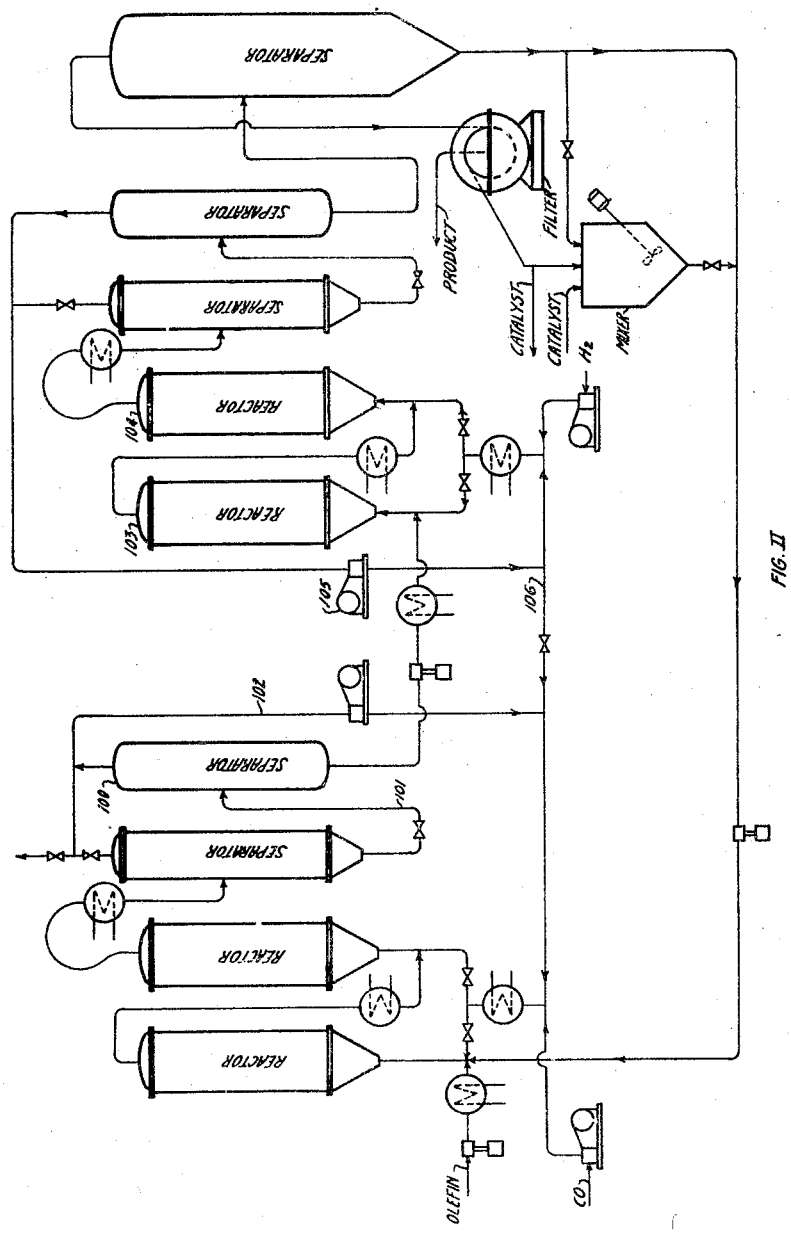
FIG. II
Inventor: James T. Harlan Jr.
By his Attorney: C. J. Ott

Patented Apr. 18, 1950

2,504,682

UNITED STATES PATENT OFFICE 2,504,682

PRODUCTION OF OXYGENATED COMPOUNDS

James T. Harlan, Jr., San Rafael, Calif., assignor to Shell Development Company, San Francisco, Calif., a corporation of Delaware Application November 8, 1946, Serial No. 708,625

5 Claims. (Cl. 260—632)

This invention relates to the production of oxygenated organic compounds through synthesis by a modification of the Oxo process.

The Oxo process provides a means for the synthesis of various oxygenated products through the addition of carbon monoxide and hydrogen to compounds containing a suitable linkage. The most important application of the Oxo process is in the production of carbinols by the addition of one molecule of carbon monoxide and two molecules of hydrogen to compounds containing an ethylenic linkage. The general reaction is:

This synthesis is effected in the presence of a metal carbonyl which is usually produced in situ under the synthesis conditions from the catalyst employed.

The reaction does not go to completion under one set of conditions, and consequently it is the practice to effect the synthesis in two stages. The reaction product from the first stage contains the carbinol along with aldehydes and appreciable amounts of the metal carbonyl. In the last stage of the process, the reaction product from the first stage is hydrogenated with free hydrogen to convert the aldehydes to the carbinol and to decompose the metal carbonyl. Since the hydrogenating activity of the catalyst is severely repressed by even relatively small amounts of carbon monoxide, a hydrogenating gas substantially free of carbon monoxide is utilized in the last stage. In both stages it is necessary to operate with an excess of gas and this is accomplished in practice by providing a separate gas recycle system for each stage. However, the recycle of a hydrogenating gas substantially free of carbon monoxide in the last stage involves certain difficulties due to the introduction of carbon monoxide dissolved in the feed and to the continuous liberation of carbon monoxide by the decomposition of the metal carbonyl. In order to maintain the content of carbon monoxide in the recycle hydrogenating gas in the last stage below permissible limits, it is the practice to subject the recycle hydrogenating gas stream to a so-called "methanization" treatment. In the methanization treatment, the carbon monoxide in the recycle hydrogenating gas is catalytically converted to methane according to the reaction

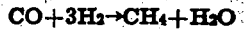

In order to prevent the methane so produced from accumulating to excessive concentrations, a part of the recycle gas is continuously discarded.

An object of the present invention is to provide an improvement in the Oxo process wherein the methanization treatment may be eliminated.

A further object of the invention is to provide an improved method for the synthesis of carbinols wherein the last stage of the process may be effected at lower pressures.

A further object of the invention is to provide an improvement in the Oxo process wherein the liberation of carbon monoxide in the last stage of the process is materially reduced or completely eliminated.

A further object of the invention is to provide an improved method for synthesis through the Oxo process wherein the synthesis may be carried out without intermediate reduction of pressure and recompression between stages.

A still further object of the invention is to provide an improved method wherein the waste of gas through venting is materially decreased.

Other objects of the invention will be apparent in the following description of the invention and certain of its modifications.

In the process of the present invention the synthesis is carried out in at least two stages. Fresh synthesis gas containing a major mol amount of carbon monoxide and a minor mol amount of hydrogen is supplied to the first stage of the synthesis along with the reactant containing the ethylenic linkage and the unreacted synthesis gas is continuously recycled in this stage. Hydrogen substantially free of carbon monoxide is supplied to the last synthesis stage and unreacted hydrogenating gas is recycled in this stage. Sufficient recycle gas from the last stage of the synthesis is continuously transferred to the gas stream recycled in the first stage of the synthesis to maintain the ratio of carbon monoxide to hydrogen in the latter recycle gas at approximately 1:1 or above. Any gas vented to prevent accumulation of inert material is vented from the recycle gas in the first stage of the synthesis. The preferred manners in which the invention may be carried into effect will be described in connection with production of primary alcohols from carbon monoxide, hydrogen and olefinic hydrocarbons. To assist in this description, reference is had to the attached drawings, wherein the more important elements and flows of the process are illustrated by diagrammatic figures not drawn to scale, and wherein:

Figure I illustrates the plant flow of a three-stage modification of the process;

Figure II illustrates the plant flow of a modification in which two different catalysts are used;

Figure III illustrates the plant flow of a simplified two-stage modification.

Referring to Figure I, the olefin feed enters via line 1 and pump 2. The olefin may be any primary, secondary or tertiary olefin or a mixture of olefins with or without inert diluent materials. For the purpose of the description of the process, an olefinic fraction and more particularly a $C_{10}$–$C_{14}$ olefinic fraction obtained from the cracking of petroleum wax is chosen as the olefin feed. Olefinic fractions from the cracking of petroleum wax are particularly desirable feeds since the olefins are largely straight chain olefins. The olefin feed after preheating in heat exchanger 3 is passed to reactor 4 via lines 5 and 6. The catalyst, for example cobalt promoted by a minor amount of thorium oxide and supported upon diatomaceous earth, is supplied to reactor 4 via pump 7 and line 6 as a slurry produced as will be described later. Carbon monoxide is forced into the system by compressor 8 via lines 9 and 10. This gas is not necessarily pure carbon monoxide, but may contain hydrogen as well as other diluents. However, the carbon monoxide predominates and is in excess with respect to hydrogen. This gas after preheating in heat exchanger 11 is split into two portions; one portion is passed via line 12 to line 6 and then to reactor 4 and the other portion is passed by line 13 to reactor 14. Recycle gas from the first stage is recycled via lines 15 and 16, compressor 17, line 18, heat exchanger 11 and lines 12, 6 and 13. This gas consists largely of carbon monoxide and hydrogen and contains the hydrogen in molecular excess with respect to the carbon monoxide. Thus, the reaction mixture passing via line 6 to reactor 4 is the product of four separate streams.

The temperature in reactor 4 may vary between about 80° C. and 200° C. and is preferably about 150° C. The pressure may vary between about 50 atmospheres and 240 atmospheres, and is preferably about 200 atmospheres. Under these conditions the synthesis takes place largely in the liquid phase. The total amount of gas supplied is sufficient to maintain the catalyst in suspension in the liquid reaction mixture and the excess above the reaction requirements is recycled. The residence time of the reaction mixture in reactor 4 may be for example about 10 minutes. The total reaction mixture is preferably, but not necessarily, transferred to a second reactor operated at a slightly higher temperature to effect further reaction. Thus, the reaction mixture is passed via lines 18 and 13 to reactor 14. The temperature in reactor 14 may be, for example, about 10° C. to about 50° C. higher than in reactor 4. The residence time in the reactor may be, for example, 10 minutes. Additional gas is passed to reactor 4 in an amount sufficient to maintain the catalyst in suspension in the liquid reaction mixture. Reactors 4 and 14 may be made integral, if desired. The total reaction mixture from reactor 14 is cooled and passed via line 19 to separator 20. The gas is recycled via line 15 as before stated. In order to prevent excessive dilution of the recycled gas, a portion of it may be vented via line 21. As stated above, the gas feed to the first stage consists predominantly of carbon monoxide. The recycle gas recycled via line 16, on the other hand, contains hydrogen and carbon monoxide in a mol ratio of at least 1:1. However, hydrogen and carbon monoxide are used up in the synthesis in this stage in a ratio somewhat greater than 1:1. The deficiency in hydrogen is supplied by the addition to the recycle gas of a portion of the hydrogen-rich recycle gas from the second stage via valved line 22.

The reaction product of the first stage is passed via pump 23 and line 24 to reactor 25 of the second stage. In the second stage, part of the aldehydes is hydrogenated and the cobalt-carbonyl (in solution in the reaction mixture) is substantially completely decomposed by the hydrogen-rich recycle gas. This may be effected under a wide variety of conditions. However, merely by way of example the temperature may be 180° C. and the pressure may be 200 atmospheres.

The total reaction mixture is cooled and passed via line 30 to separator 29. The unreacted gas is recycled by compressor 26 via lines 31, 27 and 28. As stated above, a portion of the recycle gas is continuously withdrawn to make up the hydrogen requirements in the first stage. Also, a portion of the hydrogen is consumed in the reaction. The hydrogen requirements for this stage are made up by addition of hydrogen recycle gas from the third stage via valved line 32.

The liquid reaction product from the second stage of the process, now substantially free of carbon monoxide and metal carbonyl, is passed by pump 33 via line 34 to reactor 35 of the third stage. Fresh hydrogen is supplied to this stage through line 36. Recycle gas is supplied by compressor 37 via lines 38 and 39. In the third stage of the process the aldehydes are completely hydrogenated and any trace of metal carbonyl remaining in solution is decomposed. The reaction conditions in the third stage may be the same as or different than those in the second stage and may vary considerably. By way of example, the temperature may be 200° C. and the pressure may be 200 atmospheres. The total reaction product including unused hydrogen is passed overhead via line 40 and cooler 41 to separator 42. The liquid product containing the catalyst in suspension is then passed via line 43 to a low pressure separator 44. The gas from separators 42 and 44 is recycled via line 38 and excess gas is withdrawn to the second stage as described.

The liquid product from separator 44 is passed via line 45 to a separator 46. Here the catalyst settles to a more or less concentrated slurry which is withdrawn from the bottom via line 47 and recycled as described. The liquid product withdrawn from the top of separator 46 still contains some catalyst in suspension. This product is therefore passed via line 48 to a filter 49. The product, free of catalyst, is withdrawn via line 50. Part of the catalyst is usually withdrawn via line 51. However, part or all of it may be passed to mixing tank 52 via line 53 and recycled. Fresh catalyst is added continuously or from time to time to the mixing tank via line 54. Part of the slurry from line 47 may also be passed via line 55 to the mixing tank to make up the slurry.

In the modification just illustrated the process is carried out in three separate and distinct stages. This is a most efficient process. However, the process may be carried out in two stages with some loss of efficiency but a considerable saving in plant cost. Such a modification is illustrated in Figure II. This modification, being quite similar to that illustrated in Figure I in many respects, will not be described in detail; only the differences will be pointed out. Referring to Figure II, the first stage of the process is carried out as described in connection with Figure I, except that the separator is preferably, but not necessarily, followed by a second separator 100 operated at a lower pressure in order to effect a more complete separation of gas from the reaction product. Thus, the liquid reaction product from the first separator is passed via valved line 101 to separator 100. The gas separated in both separators is then recycled within the first stage via line 102. The second stage of the modification illustrated in Figure I is missing. However, the last stage is preferably carried out in two steps. Thus reactor 103 corresponds to reactor 35 of Figure I and reactor 104 is a similar reactor to provide a greater residence time in the last stage. The hydrogenation gas is recycled in the last stage by compressor 105 and hydrogen-rich recycle gas from this stage is supplied to the recycle gas in the first stage via valved line 106. This modification is most advantageous when an ample supply of hydrogen is available, since the hydrogen requirements in the second stage are somewhat higher.

In the modification illustrated in Figures I and II, the process is carried out in stages, the same catalyst being utilized in each stage successively. In the modification illustrated in Figure III, different catalysts are utilized in the first and last stages. The consumption of relatively expensive Fischer-Tropsch catalysts in this case is somewhat less; also considerably less high pressure equipment is required which is of practical importance in some cases. In this modification, although there are three distinct steps, the synthesis is actually carried out in two stages and the intermediate step is designed solely to increase the efficiency of the last stage and decrease the hydrogen requirements in the last stage.

The first step of the process illustrated in Figure III is carried out in a manner analogous to that previously described in connection with Figure I. The olefin feed, for example the described $C_{10}$—$C_{14}$ fraction, is mixed with the catalyst in mixer 200. The catalyst may be a suitable composite of fresh and partially spent catalyst. The olefin feed and catalyst are then charged to the reactor as a slurry. A gas rich in carbon monoxide and recycle gas are also charged and the first reaction stage is carried out in two steps as previously described. Unused synthesis gas is separated from the reaction product in high pressure separator 201. This gas is further cooled and passed to a second separator 202. Some of the gas may be bled via line 203 and the remainder is recycled via line 204. The liquid products from separators 201 and 202 are then passed to a low pressure displacement column 207. This liquid product contains the catalyst in suspension and also contains dissolved carbon monoxide and dissolved metal carbonyl. For example it may contain about 0.5 gm. of cobalt as cobalt carbonyl per liter. In the absence of any appreciable partial pressure of carbon monoxide, the metal carbonyls are unstable and decompose at fairly low temperatures. Cobalt carbonyl, for example, has a normal decomposition temperature of about 60° C. When under a high partial pressure of carbon monoxide, however, as in the first reaction zone, the metal carbonyl is stable up to considerably higher temperatures. For example, cobalt carbonyl is stable up to a temperature of about 130° C. when under a partial pressure of carbon monoxide of about 80 atmospheres. By merely reducing the pressure of the reaction product from the first step while maintaining the temperature above the normal decomposition temperature, the metal carbonyl is therefore caused to begin to decompose. Merely reducing the total pressure is not sufficient, however, to cause the decomposition to proceed to completion at a sufficiently fast rate. In the modification of the process under consideration, the rate of decomposition of the metal carbonyl and the completeness of the decomposition are improved by displacing dissolved carbon monoxide in the reaction product by flushing the same with an inert gas or vapor. This gas or vapor, in this case a hydrogen-rich gas, removes dissolved carbon monoxide from the reaction product substantially as fast as it is formed therein by decomposition of the metal carbonyl. In this modification the magnitude of the reduction in pressure between the first stage reactor and the displacement column is not critical, since the stripping action of the gas is effective in reducing the partial pressure of the carbon monoxide in contact with the dissolved metal carbonyl. However, some reduction in pressure is desirable and reduction to substantially atmospheric pressure, for instance 1 to 3 atmospheres absolute, is preferred.

In accordance with the above explanations, the pressure on the reaction product is reduced and the temperature in displacement column 207 is adjusted and maintained somewhat above the normal decomposition temperature of the metal carbonyl, for example 70–80° C. Control of this temperature may be effected through control of the temperature of the feed streams or by heat addition to the displacement column (by means not shown). A portion of gas rich in hydrogen withdrawn from the recycle gas in the second reaction stage is introduced near the bottom of displacement column 207 via line 208. This gas when passed up through the liquid reaction product under these temperature conditions displaces the dissolved and liberated carbon monoxide. This not only forces the decomposition of dissolved metal carbonyl to substantial completion by upsetting the equilibrium, but also produces a liquid product substantially free of dissolved carbon monoxide. The liquid product containing the catalyst in suspension is withdrawn from the displacement column by line 209.

The hydrogen-containing gas from the displacement column and containing some carbon monoxide is cooled, passed to a separator 205, then compressed, cooled and passed to a separator 206 to separate small amounts of condensible liquid products. The residual gas still consisting largely of hydrogen is then passed via line 210 to join the recycle stream of the first reaction stage. Thus, the deficiency in hydrogen in the carbon monoxide feed in the first stage is made up with this gas from the displacement column. Since the liquid product from the displacement column is substantially free of carbon monoxide, all of the carbon monoxide is made available for use in the first reaction stage.

The liquid product from displacement column 207, after filtering to remove the catalyst, is passed via line 211 to reactor 212. Liquid condensate from separators 205 and 206 may be combined with this product via line 213. Hydrogen gas is supplied to this last reaction stage by compressor 214 via line 215. Reactor 212 is operated to provide simple and straightforward hydrogenation. Since the feed to the reactor is substantially free of carbon monoxide as well as carbon monoxide-forming material, the hydrogenation may be carried out with any one of the large number of known hydrogenation catalysts under conventional hydrogenation conditions. Merely by way of example, platinum, nickel, nickel sulfide, tungsten sulfide, copper chromite and zinc chromite may be mentioned as suitable catalysts. The optimum condition will of course depend upon the particular catalyst. When using a supported nickel hydrogenation catalyst, for example, the temperature may be about 175° C. and the pressure may be about 8 atmospheres. The necessary temperature may be obtained by preheating the feed in heat exchanger 216 and the necessary pressure is created by pump 217 and compressor 214.

The reaction product from reactor 212 is cooled and passed to separator 218. The liquid product is withdrawn via line 219. The separated gas consisting largely of hydrogen and containing substantially no carbon monoxide is recycled to the reactor by line 220 and compressor 221, and part of it is withdrawn from the recycle system via line 208 to the displacement column as described.

The most important technical application of the process of the invention is in the production of saturated primary alcohols from aliphatic olefins having between 2 and about 20 carbon atoms. In this application any of the aliphatic olefins may be used. Thus the olefin may be a primary, secondary or tertiary olefin or mixture thereof. The olefin does not necessarily have to be pure but may contain small amounts of sulfur compounds, nitrogen compounds or other normal impurities. Also inert diluent materials such as aromatic or saturated hydrocarbons, alcohols, ketones, organic acids, ethers and steam may be present. Very suitable sources of olefins are the various olefin polymer fractions obtained by the polymerization of lower olefins and olefinic products of cracking, dehydrogenation and related processes.

An important application of the process is the production of higher alcohols (for instance having from about 9 to about 17 carbon atoms) as intermediates in the production of detergents and related products. For this purpose alcohols having relatively straight chains are preferred. Since the olefins produced by the cracking of petroleum wax and those produced by the polymerization of ethylene are predominantly straight chain olefins, these olefinic products are particularly suitable feeds.

While the process is at present primarily of importance for the production of open chain monohydric alcohols, the process is also applicable for the production of carbinols having aromatic and cycloparaffin groups, as by the application of such olefinic materials as cyclohexene, cyclopentene, cyclohexylethylene, styrene and the like. Also it may be applied for the production of polyhydric carbinols from materials containing two or more ethylenic bonds such as butadiene, cyclohexadiene, etc. Hydrocarbons having one or more acetylenic linkages may also be applied.

While unsaturated hydrocarbons are by far the cheapest raw materials and are of primary interest, at present the process is not limited to the use of these materials. Thus, various oxygenated compounds containing an unsaturated bond such as unsaturated aldehydes, ketones, acids, esters, alcohols and ethers may be employed. Carbon monoxide and hydrogen add to the unsaturated bond in such compounds in a similar manner. Thus, from an unsaturated aldehyde or alcohol a saturated dihydric alcohol is produced, and from unsaturated ketones, acids, esters, and ethers the corresponding carbinol addition products are formed.

The invention claimed is:

1. In the synthesis of a carbinol by the Oxo process wherein the synthesis is carried out continuously in a plurality of stages in separate reaction zones, the olefinic reactant being introduced to a first stage and contacted under reaction conditions with the gas therein and the liquid reaction mixture being passed serially through subsequent stages wherein the synthesis is completed, the improvement which comprises adding hydrogen substantially free of carbon monoxide to the last stage of the synthesis and recycling the same therethrough, recycling a mixture of carbon monoxide and hydrogen consisting predominantly of hydrogen in an intermediate stage of the synthesis, adding a mixture of carbon monoxide and hydrogen consisting predominantly of carbon monoxide to the first stage of the synthesis and recycling unreacted gas therethrough, withdrawing a portion of the recycle gas from said last stage of the synthesis and adding it to the recycle gas in said intermediate stage of the synthesis, and withdrawing a portion of the recycle gas from said intermediate stage of the synthesis and adding it to the recycle gas in said first stage of the synthesis, the amount of gas so transferred being adjusted to maintain the ratio of hydrogen to carbon monoxide in the recycle gas in the first stage of the synthesis at least equal to 1:1.

2. Process according to claim 1 further characterized in that the catalyst is carried in suspension in the liquid product serially through the stages of the synthesis.

3. Process according to claim 1 further characterized in that the catalyst is carried in suspension in the liquid reaction mixture through the first two stages of the synthesis after which it is separated and the synthesis is completed in the third stage with a different catalyst.

4. In the synthesis of a carbinol by the Oxo process wherein the synthesis is carried out continuously in stages in a plurality of reaction zones, the improvement which comprises effecting said synthesis in the following manner: continuously introducing the olefinic reactant into the first reaction zone, continuously supplying to the first reaction zone a mixture of a major amount of carbon monoxide and a minor amount of hydrogen in an amount in excess of that consumed in said first reaction zone, withdrawing unreacted gas from said first reaction zone, discarding a portion of said unreacted gas and recycling the remainder to said first reaction zone, withdrawing liquid reaction mixture from said first reaction zone and passing the same to a second reaction zone, passing a mixture of a major amount of hydrogen and a minor amount of carbon monoxide through said second reaction zone, withdrawing said gas from said second reaction zone and recycling it back to said second reaction zone, withdrawing liquid reaction mixture from said second reaction zone and passing it to a third reaction zone, continuously supplying hydrogen to said third reaction zone in an amount in excess of that consumed in said third reaction zone, withdrawing unreacted gas from said third reaction zone and recycling the same back to said third reaction zone, thereby effecting the synthesis in three zones having individual recycle of gas therethrough, maintaining the mole ratio of carbon monoxide to hydrogen in the total gas introduced into said first reaction zone above 1:1 by transferring a portion of the recycle gas withdrawn from said second reaction zone to the recycle gas withdrawn from said first reaction zone, and transferring a like portion of the recycle gas withdrawn from said third reaction zone to the recycle gas withdrawn from said second reaction zone.

5. In the synthesis of a carbinol by the Oxo process wherein the synthesis is carried out continuously in stages in a plurality of reaction zones, the improvement which comprises effecting the synthesis in the following manner: continuously introducing the catalyst suspended in the olefinic reactant into the first reaction zone, continuously supplying to the first reaction zone a mixture of a major amount of carbon monoxide and a minor amount of hydrogen in an amount in excess of that consumed in said first reaction zone, withdrawing unreacted gas from said first reaction zone, discarding a portion of said unreacted gas and recycling the remainder to said first reaction zone, withdrawing liquid reaction mixture containing suspended catalyst from said first reaction zone and passing the same to a second reaction zone, passing a mixture of a major amount of hydrogen and a minor amount of carbon monoxide through said second reaction zone, withdrawing unreacted gas from said second reaction zone and recycling it back to said second reaction zone, withdrawing liquid reaction mixture containing suspended catalyst from said second reaction zone, removing suspended catalyst from said last-mentioned reaction mixture and passing the liquid to a third reaction zone containing a fixed bed of catalyst, continuously supplying hydrogen to said third reaction zone in an amount in excess of that consumed in said third reaction zone, withdrawing unreacted gas from said third reaction zone and recycling the same back to said third reaction zone, maintaining the mole ratio of carbon monoxide to hydrogen in the total gas introduced into said first reaction zone above one by transferring a regulated portion of the recycle gas withdrawn from said second reaction zone to the recycle gas withdrawn from said first reaction zone, and transferring a like portion of the recycle gas withdrawn from said third reaction zone to the recycle gas withdrawn from said second reaction zone.

JAMES T. HARLAN, Jr.

REFERENCES CITED

The following references are of record in the file of this patent:

UNITED STATES PATENTS

| Number | Name | Date |
|---|---|---|
| 2,264,427 | Asbury | Dec. 2, 1941 |
| 2,327,066 | Roelen | Aug. 17, 1943 |
| 2,411,760 | Sensel | Nov. 26, 1946 |
| 2,415,102 | Landgraf | Feb. 4, 1947 |
| 2,437,600 | Gresham et al. | Mar. 9, 1948 |